P. O. ANDERSON.
VIOLIN BOW.
APPLICATION FILED DEC. 3, 1913.
1,151,918.
Patented Aug. 31, 1915.
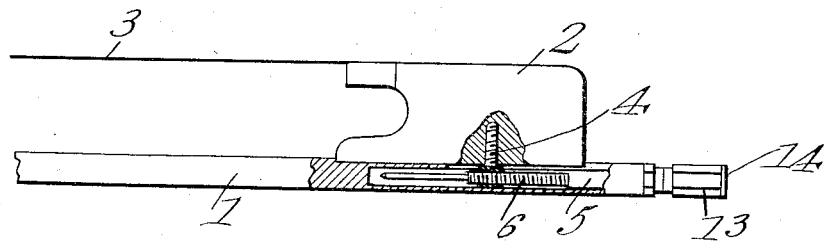
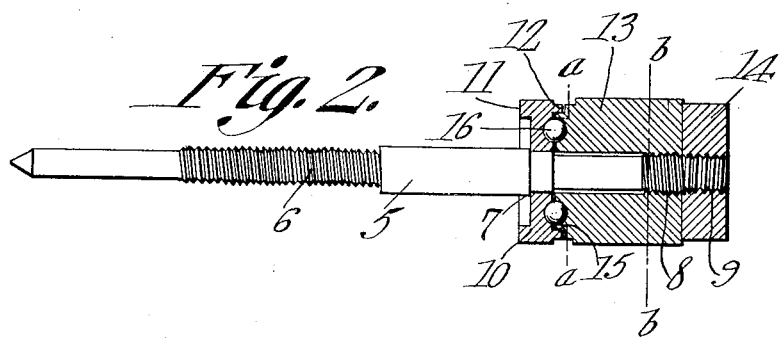
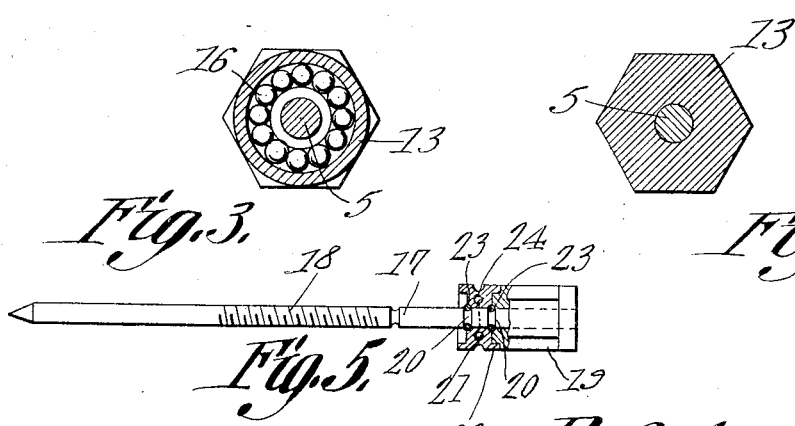
Witnesses
P. O. Anderson,
Inventor
by C. A. Snow & Co.
Attorneys

UNITED STATES PATENT OFFICE.

PHILIP O. ANDERSON, OF BOISE, IDAHO.

VIOLIN-BOW.

1,151,918.  Specification of Letters Patent.  Patented Aug. 31, 1915.

Application filed December 3, 1913. Serial No. 804,521.

*To all whom it may concern:*

Be it known that I, PHILIP O. ANDERSON, a citizen of the United States, residing at Boise, in the county of Ada and State of Idaho, have invented a new and useful Violin-Bow, of which the following is a specification.

This invention relates to violin bows, and more particularly to an adjusting device for the frog.

The object of the invention is the provision of a novel and improved adjuster for the frog, whereby the adjustment of the frog may be accomplished easily and accurately.

The present invention also has for its object the provision of an adjuster for violin bows, embodying a unique assemblage of component parts, whereby the adjuster may be readily operated, and whereby the same may be readily applied to the bow, the said device being comparatively simple, nonencumbering and inexpensive in construction, as well as being convenient, practical and efficient in its use.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a fragmental side elevation of a violin bow embodying the improved adjuster. Fig. 2 is an enlarged sectional detail view of the adjuster. Fig. 3 is a cross section on the line a—a of Fig. 2. Fig. 4 is a cross section on the line b—b of Fig. 2. Fig. 5 is an elevation of another form of the invention, partly broken away.

In the drawings, the numeral 1 indicates the staff which is of usual construction, and 2 indicates the sliding frog having the hairs 3 secured or anchored thereto in any well known manner. A nut member 4 has a threaded shank engaged into the frog and the nut projects into the hollow or socketed end of the staff 1.

The adjusting device for the frog, comprises an adjusting screw 6 projecting into the hollow or socketed end of the staff 1, and having its shank 5 projecting outwardly, and provided with an outwardly facing shoulder 7. The protruding end of the screw shank 5 is provided with the oppositely extending screw threads 8 and 9.

A cap 10 has its annular rim 11 engaged over the end of the staff 1 over the mouth of the socket or recess in the end of the staff, whereby the cap 10 is secured firmly to the staff. The shoulder 7 of the shank 5 bears against the inner side of the cap 10 to prevent the withdrawal of the screw from the cap, and the cap will therefore retain the screw 6 in place within the end of the staff 1. The outer side of the cap 10 is provided with an annular flange 12. The screw shank 5 is journaled through the cap 10 and protrudes from the outer side thereof.

The button 13 is mounted upon the protruding portion of the shank 5, and is threadedly engaged to the screw threads 8 of the shank, and a jam or retaining nut 14 is threaded upon the screw threads 9 of the shank for binding or holding the button 13 rigidly in place upon the shank of the adjusting screw. The inner end of the button 13 is reduced so as to fit rotatably within the annular flange 12 of the cap 10.

The button 13 is secured upon the protruding portion of the screw shank adjacent the cap 10, and the adjacent faces of the cap and button are provided with coöperating annular ball races between which bearing balls 16 are disposed, the balls working within the ball races for providing an anti-frictional bearing between the cap 10 and button 13. The flange 12 of the cap 10 in overlapping the reduced end portion 15 of the button 13, will inclose the bearing balls 16, to exclude dust and other extraneous matter, even though the button 13 reciprocates slightly relative to the cap 10.

It will thus be obvious that when the cap 10 is engaged over the end of the staff 1, so that the screw 6 engages through the nut member 4 of the frog 2, the button 13 being rotated, will cause the frog to be adjusted longitudinally along the staff 1. The anti-frictional bearing between the button 13 and cap 10 enables the button to be readily rotated for obtaining an easy and accurate adjustment of the frog. The cap 10 provides a convenient bearing for the button, for the provision of the anti-frictional balls between the cap or bearing 10 and the button 13, and the cap also enables the adjusting device to be readily applied to the end of the staff.

In the form of the invention illustrated in Fig. 5, the same general construction as above described is present, with some changes and additions. The adjusting screw 18 has the shank 17, and the cap 21 which is engageable over the end of the staff, has the shank 17 journaled therethrough. The button, in this form, comprises a body portion or section 19, and a cap or section 22 engaged over the reduced inner end of the body portion or section 19 and arranged adjacent the cap 21. The shank 17 is provided with annular grooves 20 adjacent the remote sides of the caps 21 and 22, and spring rings 23 are engaged within the grooves 20 and bear against the remote sides of the caps 21 and 22 to hold them together, and to hold the screw and cap of the button against outward movement relative to the cap 21. The adjacent sides of the caps 21 and 22 are provided with coöperating annular ball races, between which the bearing balls 24 are disposed to work within the ball races for providing the anti-frictional bearing.

With the form illustrated in Fig. 5, the caps 21 and 22 may be readily assembled upon the shank 17, in which event the spring or split rings 23 may be snapped within the grooves 20 for locking the caps in place upon the shank, and then the body portion or section 19 of the button may be applied to the shank and cap 22.

What is claimed is:—

1. A violin bow adjuster embodying a cap, an adjusting screw having its shank journaled through the cap and protruding from one side thereof, the screw shank having means bearing against the other side of the cap for preventing the withdrawal of the screw from the cap, and a button secured upon the protruding portion of the screw shank adjacent the cap.

2. A violin bow adjuster embodying a cap, an adjusting screw having its shank journaled through the cap and protruding from one side thereof, a button secured upon the protruding portion of the screw shank and comprising a body portion and a cap engaged over the inner end of the body portion and arranged adjacent the aforesaid cap, and means carried by the screw shank and engaging the remote faces of the two caps to hold the parts together.

In testimony that I claim the foregoing as my own, I have hereto affixed my signature in the presence of two witnesses.

PHILIP O. ANDERSON.

Witnesses:
A. F. GRAVES,
WILLIAM RIOPELLE.